Sept. 3, 1940.   R. B. ELLARS   2,213,340
BRAKE
Filed Aug. 3, 1938   2 Sheets-Sheet 1
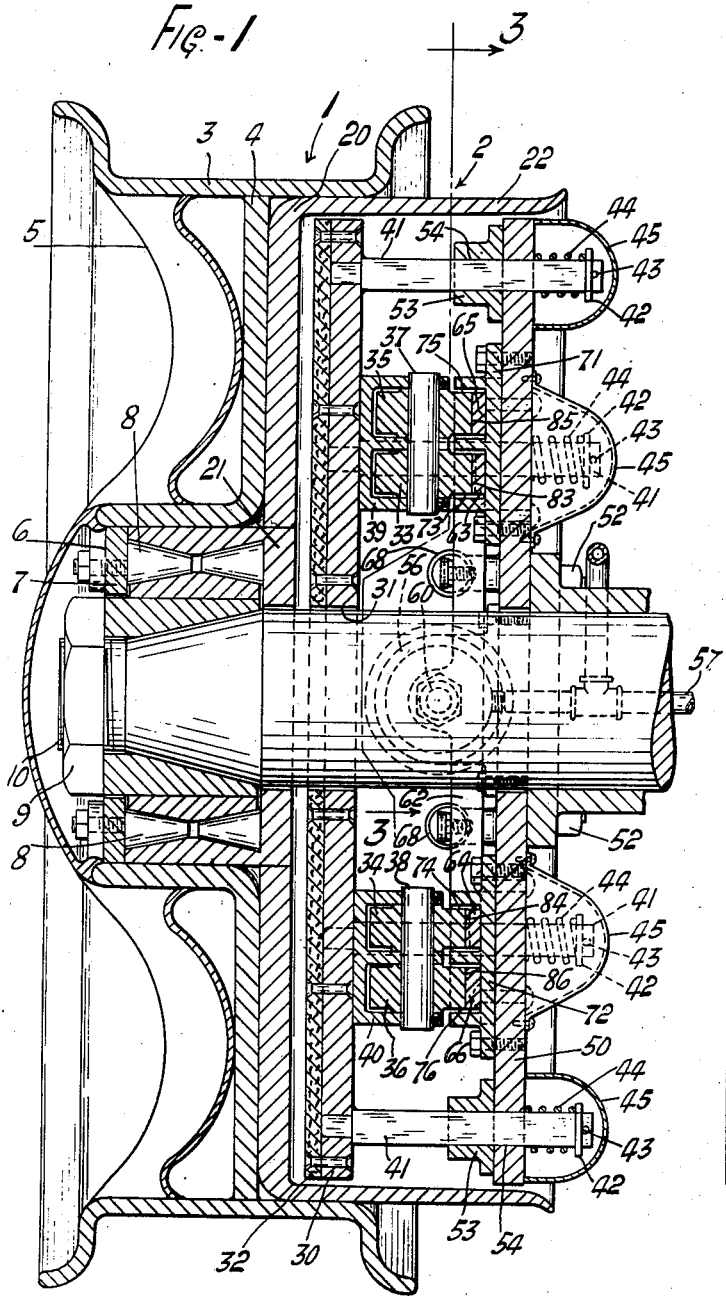
INVENTOR
RALPH B. ELLARS
BY
Ely + Frye
ATTORNEYS

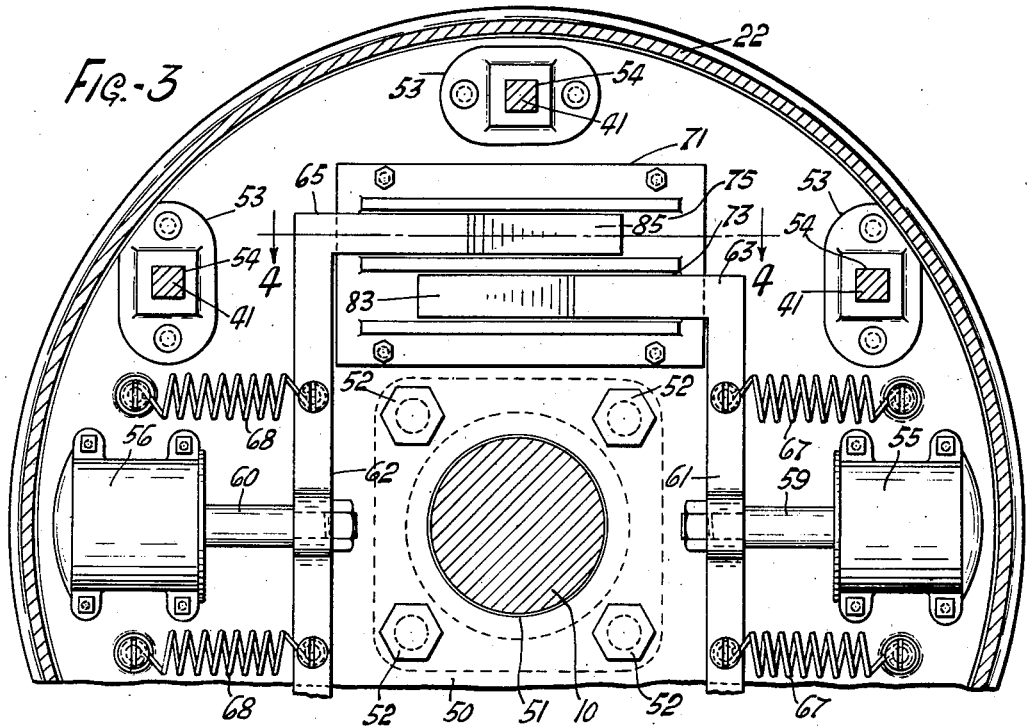
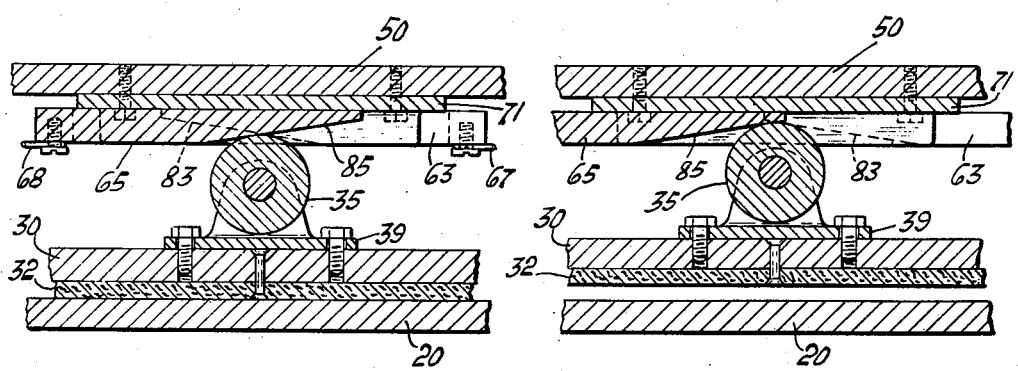
Fig.-3
Fig.-4
Fig.-5
INVENTOR
RALPH B. ELLARS
BY
Ely + Frye
ATTORNEYS Patented Sept. 3, 1940

2,213,340

UNITED STATES PATENT OFFICE 2,213,340

BRAKE

Ralph B. Ellars, University Heights, Ohio

Application August 3, 1938, Serial No. 222,806

11 Claims. (Cl. 188—72)

This invention relates to improvements in brakes and more particularly, to improvements in disk brakes which are hydraulically operated.

It is an object of this invention to provide a disk brake in which a maximum area of braking surface is available and also to provide a brake in which all portions of such maximum available braking area will be engaged during the actuation of the brake.

It is a further object of this invention to provide a brake in which all of the friction material thereof will be subjected to equal wear, thereby increasing the economy and the life of the braking material and reducing the number of necessary repairs and adjustments. A still further object is to provide a brake actuating mechanism which inherently adjusts itself for wear, thereby obviating the necessity for adjustment among the several brakes in the brake system.

Another object of this invention is to provide a brake actuating mechanism which is simple in construction and operation, which may be readily dissembled for inspection and repair and which is light, strong and rugged. A further object is to provide a brake actuating mechanism having a small number of parts which are compact in design but which afford a large mechanical advantage and an assurance of smooth and positive brake action.

Another object of this invention is to provide a brake which will not accumulate water, grit, and other foreign matter on the braking surfaces and which will dissipate the heat generated during the braking action.

Other objects and advantages of this invention will be apparent from the following specification and claims:

In the drawings:

Fig. 1 is a vertical cross-section of a preferred form of the brake, showing the brake operating mechanism in the inoperative position;

Fig. 2 is a side elevation of the disk brake shoe shown in section in Fig. 1;

Fig. 3 is a fragmentary elevation of the backing plate, taken along line 3—3 of Fig. 1, but showing the brake operating mechanism in its operative position;

Fig. 4 is a fragmentary cross-section of the brake operating mechanism taken along line 4—4 of Fig. 3; and Fig. 5 is a view similar to Fig. 4 but showing the brake operating mechanism in the inoperative position.

In the drawings in which like figures represent like parts, I represents an artillery type wheel arbitrarily selected to illustrate the brake 2, which is the subject matter of this invention. In the wheel I, the rim 3 is carried by the load disk 4 and the ornamentally spoked curtain disk 5. The nave of the load disk 4 engages the hub 6 and is demountably received thereon by stud bolts carried by the stud ring 7. The hub 6 carries the radial-thrust bearings 8 and is secured by the hub nut 9 to the axle 10.

The essential structural elements of the brake 2 are a flanged brake disk 20, a shoe disk 30 and a backing plate 50. In the illustrated embodiment of this invention the brake disk 20 is shown welded to the wheel I and extending from the hub 6 to the rim 3. A supplemental brake ring 21 is shown integral with the outer race of the radial thrust bearing 8 and extending from the brake disk 20 to the axle 10. When the wheel is mounted as shown, the braking surface of the ring 21 is flush with the braking surface of the disk 20 and the brake is thereby provided with a substantially integral braking surface extending from the axle to the rim of the wheel. It is obvious that for a wheel of different construction than the one illustrated, the brake disk 20 may be welded or otherwise secured directly to the hub of the wheel and may extend from the axle outwardly as far as desired or permitted by the wheel size. The outer circumference of the brake disk 20 carries the flange 22, which is made of sufficient depth to include the shoe disk 30 and the backing plate 50. The flange 22 has a slight outward taper and a flared edge to throw off water and dirt which might tend to accumulate in and about the brake.

The shoe disk 30 is provided with a central opening 31 by which it is received on the axle 10 and extends outwardly from the axle 10 to the flange 22, with the allowance, however, of a sufficient clearance between the shoe disk 30 and the flange 22 to permit water, grit, or other foreign matter to pass over the periphery of the shoe disk. As shown in Fig. 2, the shoe disk 30 is faced with suitable friction material 32 which engages the braking surface of the brake disk during the operation of the brake. The friction material 32 may be riveted or otherwise suitably secured to the shoe disk 30. On the back of the shoe disk 30 and substantially equidistant between the center of the shoe disk to the upper periphery thereof is located the upper bearing bracket 39; the lower bearing bracket 40 is similarly mounted below the center of the shoe disk. The upper bearing bracket 39 is preferably formed as a double bracket in order to space the upper bearing rollers 33 and 35, which are rotatably mounted on the pin 37, fixed in the upper bearing bracket 39. Similarly, the lower bearing rollers 34 and 36 are rotatably mounted on the pin 38, which is fixed in the lower bearing bracket 40. Since the bearing rollers are subjected to wear, they are preferably case-hardened.

Located adjacent the periphery of the shoe disk are a plurality of torque rods 41. The torque rods 41 extend rearwardly of the shoe disk and axially therefrom. In the present embodiment the torque rods are shown as square members, having reduced shank portions which are received in sockets broached in the shoe disk 30 and welded thereto. By using torque rods which are square in section, the rods are provided with plane bearing surfaces.

The backing plate 50 is provided with a central opening 51 through which it is received on the axle 10 and extends from the axle 10 outwardly to the flange 22. The backing plate 50 is secured to the fixed flanged axle housing 11 by suitable means, such as by bolts 52. The small annular space between the periphery of backing plate 50 and the flange 22 may be sealed, if found desirable, by suitable packing (not shown). Adjacent the periphery of the backing plate 50 are located a plurality of bosses 53, which may be riveted or otherwise secured to the face of backing plate 50. The bosses 53 and backing plate 50 are broached to provide journals 54 through which the torque rods 41 extend to the rear of backing plate 50. The ends of the torque rods 41 are provided with washers 42 which are secured thereto by cotter pins 43. Compression springs 44 are carried by the torque rods 41. The compression springs 44 are engaged between the backing plate 50 and the washers 42 and serve to withdraw the disk shoe 30 from engagement with the braking disk 20. Caps 45 are provided to cover and protect the portions of the torque rods 41 which extend to the rear of backing plate 50 and are demountably secured by backing plate by machine screws or the like. Graphite or other suitable lubricant is provided to lubricate the torque rods 41 in the journals 54. By journaling the torque rods 41 in the bosses 53 and backing plate 50, the shoe disk 30 is carried forwardly of the backing plate 50 and is limited to axial movement only with respect to the fixed backing plate 50.

As shown in Fig. 1 and Fig. 3, the brake operating mechanism is carried on the face of the backing plate 50. The brake operating mechanism is actuated by a pair of opposed single-acting hydraulic cylinders and pistons 55 and 56 mounted horizontally on the backing plate 50. Each cylinder and piston is connected through a T-connection to the line 57, which is in a suitable hydraulic pressure system. Each of the hydraulic cylinders 55 and 56 is located adjacent the periphery of the backing plate 50 in order to allow for the necessary travel of the piston rods 59 and 60. Secured to the end of the piston rod 59 is a fork 61 carrying a pair of symmetrically arranged tines 63 and 64. Secured to the end of the piston rod 60 is a fork 62 having a pair of symmetrically arranged tines 65 and 66. Symmetrically arranged on either side of cylinder 55 are located a pair of tension springs 67 which are suitably secured to the fork 61 and backing plate 50. Tension springs 67 act against the hydraulic pressure in cylinder 55 and serve to retract the piston rod 59 and fork 61. A similar pair of tension springs 68 are secured to the fork 62.

Suitably secured to the backing plate 50 and located substantially equidistant between the center and upper periphery thereof is the upper travel plate 71 in which are cut horizontal channels 73 and 75 which receive the fork tine 63 and the fork tine 65, respectively. Similarly located on the lower portion of the backing plate is the lower travel plate 72 in which the channels 74 and 76 are cut and in which are received the fork tine 64 and the fork tine 66, respectively. The channels 73, 74, 75, and 76 are lubricated with graphite or similar suitable lubricant.

The ends of each of the tines 63, 64, 65, and 66 are provided with beveled case-hardened surfaces 83, 84, 85, and 86 which engage the case hardened bearing rollers 33, 34, 35, and 36, respectively, as shown in Figs. 1, 4 and 5, the bevels 83 and 85 and 84 and 86, respectively, being opposed to each other. The length of the bevels is made slightly greater than the maximum travel of the piston rods 59 and 60 and the depth of the bevels is made slightly greater than the minimum allowable clearance between the brake disk 20 and the friction material 32 plus the depth of the maximum allowable wear of the friction material 32 in order to afford the maximum mechanical advantage to be obtained from the engagement of the wedge-like beveled surfaces of the tines with the shoe rollers.

The operation of the brake constructed according to this invention is as follows:

Upon the application of hydraulic pressure which is transmitted through the line 57, the piston rods 59 and 60 move outwardly from the cylinders 55 and 56 against the tension of the springs 67 and 68, respectively. The outward movement of the piston rod 59 carries the fork 61 to the left, moving its tines 63 and 64 in the channels 73 and 74. Similarly, the outward movement of the piston rod 60 carries the fork 62 to the right, moving its tines 65 and 66 in the channels 75 and 76. Due to the action of the compression springs 44 on the torque rods 41, the bearing rollers 33, 34, 35, and 36 are in constant engagement with the beveled surfaces 83, 84, 85, and 86 of the tines 63, 64, 65, and 66, respectively, as shown in Fig. 5. Upon the movement of the fork 59 to the left and the movement of the fork 60 to the right, the opposed bevel surfaces 83 and 85 and 84 and 86 move toward each other, wedging the bearing rollers 33, 34, 35, and 36 away from the backing plate 50 and forcing the shoe disk 30 and friction material 32 into braking engagement with the brake disk 20, as shown in Fig. 4. Upon release of the hydraulic pressure in the braking system, the springs 67 and 68 retract the forks 61 and 62, and the compression springs 44 withdraw the shoe disk 30 from engagement with the brake disk 20, returning the brake to its inoperative position as shown in Fig. 5.

The braking pressure is, of course, equal to twice the hydraulic pressure in the line 57 multiplied by the mechanical advantage obtained from the beveled ends of the fork tines. Due to the fact that the ratio of the length of the bevel to the depth is usually approximately 10 to 1, not only is the mechanical advantage obtained thereby large, but also the application of braking pressure and the action of the brake is very smooth. The reaction force of the braking pressure on the brake disk 20 is amply taken care of by the radial thrust bearings 8.

Substantially the entire torque load on the shoe disk 30 is taken by the torque rods 41. By securing the torque rods adjacent the periphery of the shoe disk and the backing plate, three advantages are secured, namely, the shoe disk 30 receives a maximum stiffening effect, the necessary size and weight of the rods 41 is reduced to a minimum, and the bearing load in the bosses 53 is reduced to a minimum.

The structure of this brake is such that the wear on the friction material 32 is automatically taken up by the actuation of the operating mechanism. When the friction material is new, the travel of the bearing rollers 33, 34, 35, and 36 on the beveled surfaces is slight. As the friction material wears, however, the travel of the bearing rollers on the beveled surfaces during the operation of the brake increases, it being apparent from Figs. 4 and 5 that the travel of the bearing rollers on the beveled surfaces is proportional to the clearance between the brake disk 20 and the friction material 32. Because of the mechanical advantage of the fluid pressure in the hydraulic operating system over the actual braking pressure is substantially constant, due to the fixed angle of slope of the beveled members 83, 84, 85, and 86, regardless of the distance the beveled members may have to be moved, a given fluid pressure in the hydraulic operating system will produce a given braking pressure between the friction material 32 and the brake disc 20.

The shoe disk 30 is made sufficiently stiff to withstand twisting and warping loads during the actuation of the brake in order to assure that all areas of the friction material will be worn evenly and, consequently, slowly.

Water, grit, and other foreign matter which might tend to accumulate on the brake disk 20 and impair the action of the brake is carried away by centrifugal force as the wheel rotates, due to the clearance provided between the periphery of the shoe disk 30 and the flange 22 and also due to the outward taper of the flange 22.

In the embodiment disclosed, heat generated during the braking action is conducted directly to the wheel 1 and radiated by the spokes in the ornamental curtain 5. It is a further advantage of a disk brake that, because the heat generated during braking is not localized, the brakes will not tend to warp due to the heat generated during braking.

Obviously this invention is not limited to the embodiment disclosed. To use this invention in connection with the several types of standard wheels for automobiles, trucks, busses, airplanes, or railroad cars, the skill and experience of a mechanic may be required to modify the construction of the embodiment disclosed to meet the specific demands of the intended use without, however, departing from the spirit and scope of the invention. This invention, therefore, is not limited to the specific embodiment disclosed, either in whole or in part, but only by the appended claims.

What is claimed is:

1. A disk brake adapted to be actuated by hydraulic pressure, comprising an axle and an axle housing, a hub mounted on said axle, a demountable wheel secured to said hub, a rim on said wheel, a flanged brake disk integral with said wheel and extending substantially from said hub to said rim, an auxiliary brake ring secured to said hub and flush with said brake disk, a backing plate mounted on said axle housing and enclosed within said brake disk flange, a plurality of bosses on said backing plate and adjacent the periphery thereof, a disk shoe between said braking disk and said backing plate and extending substantially from said axle to said flange, a plurality of torque rods journaled in said bosses and integral with said disk shoe, hydraulic cylinders mounted on said backing plate, and means actuated by said hydraulic cylinders to force said disk shoe into braking engagement with said brake disk.

2. A disk brake adapted to be actuated by hydraulic pressure, comprising a demountable wheel, a flanged brake disk integral with said wheel and extending over substantially the entire side area of said wheel, a fixed backing plate, a plurality of torque rods journaled in said backing plate adjacent the periphery thereof, a shoe disk carried by said torque rods and presenting a braking surface substantially equal in area to said brake disk, means to normally hold said shoe disk out of engagement with said brake disk, and hydraulically operated means to force said shoe disk into braking engagement with said brake disk said operating means being movable linearly across said backing plate.

3. In a disk brake, a rotating brake disk, a shoe disk, rollers on the back of said shoe disk, a backing plate, torque rods journaled in said backing plate and integral with said shoe disk adjacent the periphery thereof, an opposed pair of forks carried on said backing plates, symmetrically arranged tines on said forks having beveled ends, a pair of travel plates secured to said backing plate and channeled to receive the tines of said opposed forks, means carried by said torque rods operative to hold said shoe disk normally out of engagement with said brake disk and to hold said rollers in engagement with the beveled ends of said opposed forks, hydraulically operated means to actuate said opposed forks and thereby wedge said shoe disk into braking engagement with said brake disk, and means to retract said opposed forks, thereby said shoe disk is withdrawn from braking engagement with said brake disk.

4. In a disk brake, a rotating brake disk, a shoe disk, a backing plate, torque rods journaled in said backing plate and integral with said shoe disk adjacent the periphery thereof, an opposed pair of forks carried on said backing plate, symmetrically arranged tines on said forks having beveled ends, bearing members secured to said shoe disk, means to maintain said bearing members in engagement with the beveled ends of said fork tines, and means to actuate said forks to wedge said shoe disk into braking engagement with said brake disk.

5. In a disk brake, a rotating brake disk, a shoe disk, a backing plate, opposed wedging members carried by said backing plate and engaging said shoe disk, and means to actuate said wedging members to force said shoe disk into engagement with said brake disk.

6. In a disk brake, a backing plate, a shoe disk axially movable in relation to said backing plate, a travel plate secured to said backing plate and having a linear channel cut therein, a beveled member movable in said channel and engaging said shoe disk, and means to move said beveled member linearly in said channel whereby said shoe disk is moved axially in relation to said backing plate.

7. In a disk brake, a backing plate, a shoe disk axially movable relative to said backing plate, opposed beveled members, a bearing member engaging said opposed beveled members, and means to actuate said beveled members to force said shoe disk to move axially with respect to said backing plate.

8. In a disk brake, a shoe disk, a backing plate, a plurality of torque rods journaled in said backing plate and integral with said shoe disk adjacent the periphery thereof, a plurality of brackets secured to said shoe disk, rollers mounted in said brackets, and brake actuating means carried by said backing plate and engaging said rollers.

9. In a disk brake, a shoe disk having a central opening, torque rods secured to said shoe disk adjacent the periphery thereof, brackets mounted on said disk intermediate of said opening and said torque rods, and rollers mounted in said brackets.

10. In a disk brake, a backing plate having a central opening, a plurality of bosses integral with said backing plate and adjacent the periphery thereof, said bosses and backing plate being journaled to receive torque members, a pair of channeled travel plates secured to the face of said backing plate intermediately of said central opening and the periphery of said backing plate.

11. In a disk brake, a backing plate having a central opening, a plurality of bosses integral with said backing plate and adjacent the periphery thereof, said bosses and backing plate being journaled, and a guide member secured to the face of said backing plate intermediately of said central opening and the periphery thereof.

RALPH B. ELLARS.